United States Patent [19]

Berg

[11] 4,160,577

[45] Jul. 10, 1979

[54] HEAT RECUPERATOR

[75] Inventor: Charles A. Berg, Buckfield, Me.

[73] Assignee: Pyreflex Corporation, Buckfield, Me.

[21] Appl. No.: 840,632

[22] Filed: Oct. 11, 1977

Related U.S. Application Data

[63] Continuation-in-part of Ser. No. 663,370, Mar. 3, 1976, Pat. No. 4,082,414, and Ser. No. 773,687, Mar. 2, 1977, abandoned.

[51] Int. Cl.$^2$ ............................................. G02B 5/124
[52] U.S. Cl. ...................... 350/1.1; 350/103; 350/292; 350/320
[58] Field of Search ............... 350/1.1, 1.6, 1.7, 102, 350/103, 288, 292, 320

[56] References Cited

U.S. PATENT DOCUMENTS

| | | | |
|---|---|---|---|
| 2,012,933 | 8/1935 | Davidson | 350/102 |
| 2,854,349 | 9/1958 | Dreyfus et al. | 350/1.6 X |
| 3,229,682 | 1/1966 | Perlmutter et al. | 350/102 X |
| 3,417,959 | 12/1968 | Schultz | 350/102 X |
| 3,948,714 | 4/1976 | Steiner et al. | 350/103 X |

FOREIGN PATENT DOCUMENTS 972725  2/1951  France ............................................ 350/103

*Primary Examiner*—John K. Corbin
*Assistant Examiner*—John D. Lee
*Attorney, Agent, or Firm*—Kenway & Jenney

[57] ABSTRACT

Radiant energy emitted from a source (e.g., a door of, or a workpiece within, an industrial furnace), which would otherwise be lost, is recuperated by the placement of an array of reflective cells in the path of the emitted beam. Each reflective cell comprises multiple reflecting surfaces for reflecting the incident beam back toward the opening even if the beam is not perpendicular to any of the reflecting surfaces. The individual facets of each cell are shaped to reduce scattering losses. Additionally, secondary arrays of reflective cells can be employed to intercept, and thus recuperate, even the reduced amount of rays scattered from the primary array. Focusing techniques are employed to minimize dispersion losses.

18 Claims, 15 Drawing Figures

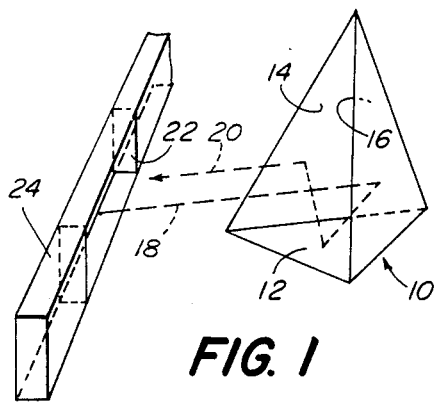
FIG. 1
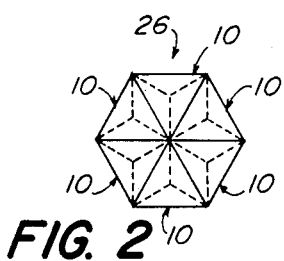
FIG. 2
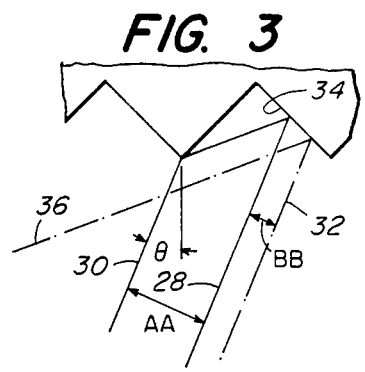
FIG. 3
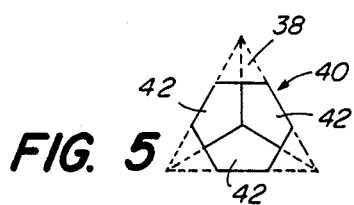
FIG. 4
FIG. 5
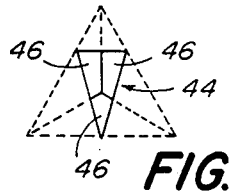
FIG. 6
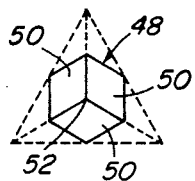
FIG. 7
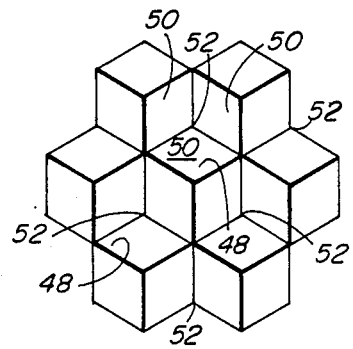
FIG. 8
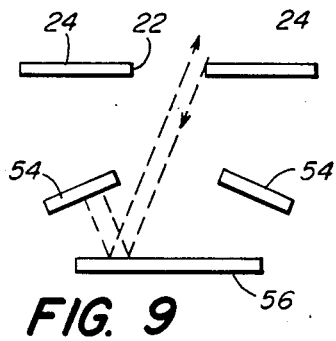
FIG. 9

HEAT RECUPERATOR

CROSS-REFERENCE TO RELATED APPLICATIONS

This application is a continuation-in-part of U.S. patent application Ser. No. 663,370, filed Mar. 3, 1976 now U.S. Pat. No. 4,082,414 (April 4, 1978), and of U.S. patent application Ser. No. 773,687, filed Mar. 2, 1977, now abandoned each of which is assigned to the assignee hereof, and each of which is incorporated herein by reference.

BACKGROUND OF THE INVENTION

This invention relates to the useful recovery of heat. In particular, it relates to devices and techniques effective to return radiant energy (e.g., heat) emitted from a source back to that source (e.g., the open door of an industrial furnace, or preferably, directly to a material that has been heated to high temperature, and that loses heat by radiation while still in the furnace or while being transported outside the furnace to another station for further processing).

SUMMARY OF THE INVENTION

Briefly, in one aspect the present invention features structures and methods for reflecting an incident beam of radiation, the beam being incident from any direction within a large solid angle. The recuperator reflects the beam, in at least one reference plane, through an angle of substantially 180° to return it to the radiative source. The recuperator comprises a plurality of reflecting cells, each comprising a substrate which defines a plurality of planar surfaces intersecting each other in angles of approximately 90° and each coated on its surfaces facing the radiation with a material which reflects a major fraction of incident radiation in the wavelength band of about one micron to about 20 microns. In order to reduce scattering losses, each of the planar surfaces is in the form of a geometric figure having at least four edges.

In another aspect, whatever the shape of the reflective cells of the array, one or more secondary arrays of cells may be provided and oriented with respect to the primary array such that the radiant energy scattered from the primary array (i.e., not returned to the original source of heat) is intercepted by a secondary array and returned to the primary array for subsequent reflection, by the primary array, to the original source of heat. If the incident radiation has direction cosines of a, b, c, in a coordinate system oriented with the intersections of the planar surfaces of the reflective cells, preferably any secondary array is oriented with respect to the primary array in a plane approximately perpendicular to a direction defined by direction cosines chosen from the following group:

| | | |
|---|---|---|
| −a, | b, | c, |
| −a, | −b, | c, |
| a, | −b, | c, |
| a, | −b. | −c, |
| a, | b | −c, |
| −a, | b, | −c, |

In yet another aspect of the invention, dispersion losses from the heat recuperator defined by two or more intersecting surfaces are controlled by orienting those surfaces to intersect at angles of $(\pi/2 - \delta)$ radians, where $\delta$ is small relative to $\pi/2$, and by providing each cell of the array with an aperture dimension of $\lambda$. Preferably, such a heat recuperator is used with a source that is disposed a distance from the array of cells that is less than (and preferably exactly one half) the "focal distance" of the array of cells having the facet angles and aperture dimensions as defined.

BRIEF DESCRIPTION OF THE DRAWINGS

Other objects, features, and advantages of the invention will appear from the following description of various aspects thereof, taken together with the accompanying illustrative drawings, in which various dimensions are exaggerated for clarity. In the drawings:

FIG. 1 is a schematic illustration of a trihedral (i.e., three faceted) reflective cell over which the present invention is an improvement;

FIG. 2 is a schematic illustration of an array of trihedral reflecting cells such as that shown in FIG. 1;

FIG. 3 is a schematic illustration of the effects of scattering at a corner reflector;

FIG. 4 is a plan view of a single reflective cell in accordance with my previous patent application indicating the regions of the cell that are primarily responsible for scattering losses;

FIG. 5 is a view similar to FIG. 4 illustrating one embodiment of the modified reflective cell according to the present invention that avoids large portions of the scattering losses inherent in the previous design;

FIG. 6 is a view of another embodiment of a modified reflective cell;

FIG. 7 is an illustration of yet another embodiment of a modified reflective cell;

FIG. 8 is a plan view of an array of reflective cells as illustrated in FIG. 7;

FIG. 9 is a schematic illustration of the use of primary and secondary arrays of cells to reduce scattering losses;

DESCRIPTION OF PREFERRED EMBODIMENTS

General

Figure 10:
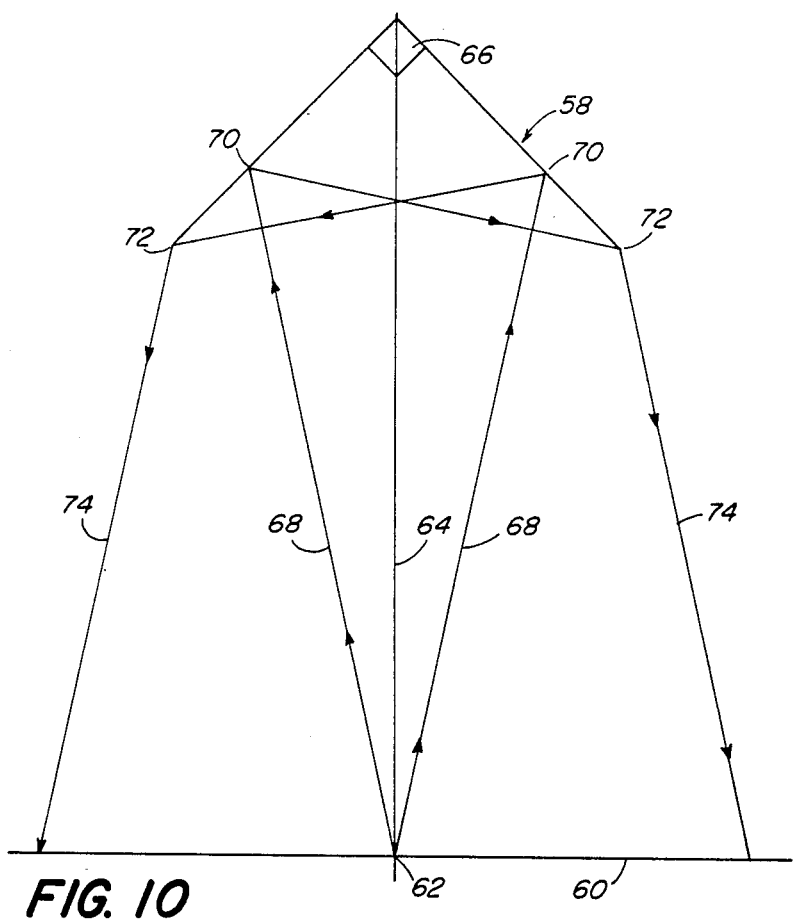
FIG. 10 schematically illustrates dispersion effects associated with a right angle dihedral reflective cell.

As explained in the above-mentioned U.S. Pat. application Ser. No. 663,370, devices to achieve the recuperation of radiative heat loss in industrial situations (a) require high specular reflectance in the infrared, (b) should be easily cleanable, (c) should not required exacting alignment, (d) should not be overly fragile, (e) should minimize (to the degree possible) scattering losses, and (f) should minimize (to the degree possible) the effects of radiation dispersion. The improved structures according to the present invention, which are illustrated in the drawings and described in detail below, are directed predominantly to yet further improvements in the reduction of scattering and dispersion losses.

The major energy losses, if conventional visible light corner cube reflectors were to be used for heat recuperation, are scattering and dispersion. Control of scattering losses is effected through design of the shape of the reflecting facets. I have thus found how to produce a retroreflecting cell in which (1) scattering losses are reduced to a minimum, and (2) which when it is placed within a prescribed distance from a source, reflects energy back to the source with no greater dispersion than a perfect cube corner reflector (or a perfect rectangular two-dimensional reflector, as the case may be), and which, when it is placed at the proper distance from the source, reduces the effects of dispersion in reflected beams to one half that which would be found in reflection from a perfectly aligned right angle cube corner reflector (or a perfectly aligned two-dimensional right angle reflector), of the same size. (By "the effects of dispersion" here I mean the diameter of the reflected beam measured at the plane of the source.)

Moreover, the reflecting structure that I have found can be manufactured in mass quantity, to the tolerances required to provide the performance described above. This fact is significant. It may be recognized that a perfect cube corner reflector will reflect energy back toward its source. But, it is not possible to produce a perfect cube corner reflector. Nor is it possible to produce a nearly perfect cube corner reflector in mass quantity, in a process that provides commercially attractive yields. But it is possible, through using the reflecting structure described in detail below, to mass produce reflecting cells having deliberately introduced departures from the angular alignment of perfect cube corner reflectors, and wich when used within a prescribed distance from the source of radiation, reflect energy with substantially less dispersion than a perfectly aligned cube corner reflector of the same size.

Turning to the problem of scattering, for a "retroreflector" to work properly, each ray entering the reflecting cell must make a reflection on each facet in the cell. In dihedral cells (two-dimensional units) each ray must be reflected twice; in trihedral cells (e.g. cube corner reflectors) each ray must be reflected three times. Now, for rays at certain angles of incidence, entering the reflecting cell in certain sectors of the frontal area, it is not possible for the ray to make the required number of reflections. For example, a ray may enter a "cube corner" type of reflector and be reflected off of one facet, only to miss making a second or third reflection entirely. Such a ray is said to be scattered; it is not returned toward its point of origin.

Scattering apparently has not received much attention in the design and manufacture of visible light corner cube reflectors. For example, without substantial scattering and dispersion, a reflective highway sign would return all light to the vehicle headlight. The sign intercepts only a "signal" representing a small fraction of the highlight output. Scattering (and other effects) permits the reflection of only a small fraction of that fraction to the eye of the driver.

In radiant heat recuperation, via multiple reflection, it is necessary to reduce the effects of scattering as much as possible and one is concerned with the precise recuperation of all radiated energy, rather than with the sampling and diffuse reflecting of a small "signal." Scattering detracts directly from the efficiency of heat recuperation. In fact, scattering is the most serious form of loss that occurs in radiant heat recuperation.

Recuperators according to the present invention comprise reflecting cells which superficially resemble "cube corner reflectors" which have been used in visible light situations (e.g., reflective highway signs). However, the structure of the present reflecting cells as described below, is distinctly different from a cube corner reflector. The distinctive structure of the present reflective cell is related to its performance as a radiant heat recuperator. (The analysis and structure described herein, however, may have applications in other fields, as well.)

The performance of a radiative recuperator is affected by
 (i) scattering,
 (ii) dispersion, and
 (iii) diffraction (possibly)

And, of course, the usefulness of any reflecting structure that is to be used for heat recuperation is directly affected by the costs of manufacturing it in large quantity.

The structures described in detail below, with reference to the accompanying drawings, have features improving performance (viz-a-viz scattering and dispersion, for example) over conventional corner cube reflectors (either the theoretical model or the commercial available devices), while avoiding features (e.g., extremely precise tolerances) that would raise manufacturing costs to an intolerable level.

As explained in greater detail below, either in conjunction with these structure features of individual cells, or independent of them, secondary arrays of reflective cells, if appropriately placed, can return a large fraction of radiant energy scattered from the primary array to the primary for reflection back to the original source.

THE DRAWINGS

Referring now to FIG. 1, there is shown, with proportions exaggerated to simplify the explanation, a single trihedral reflector cell 10 formed by the intersection of substantially orthogonal surfaces 12, 14, and 16 in accordance with the teaching of Ser. No. 663,370. Viewed from the front, such a reflective cell looks like an equilateral triangle and any incident ray 18 is returned, after multiple reflections in the cell 10, to its source as a reflected ray 20. (In the typical, practical circumstances employing such cells, the source will be an opening 22 in an industrial furnace wall 24; or, more precisely, the heated workpiece itself. For clarity of explanation, the dimensions of the reflective cell 10 are greatly enlarged compared to the typical industrial situation. The opening may be many feet long, while each reflective cell according to the present invention would preferably be between 1 cm. and 15 cm. across.)

An array of the reflective cells 10 is illustrated in FIG. 2. The array 26 of six such reflective cells is hexagonal in exterior shape. Hexagons, of course, can fill a plane, and thus are a desirable shape for the reflecting units.

As explained in my co-pending application Ser. No. 633,370, however, even with a large array of cells positioned to intercept all radiation from opening 22, scattering losses, which depend upon the angle of incidence of the incident rays, can be expected. Such losses can be explained with reference to FIG. 3, which shows, for simplicity, a dihedral (two-surfaced) reflector. At any angle of incidence $\theta$, an incoming ray 28 which lies in the band A—A of an incident beam will make two reflections on cell facets and, therefore, will be reflected, as desired, to form a parallel reflected ray 30. An incoming ray 32, however, which lies in the band B—B will make only one reflection from one facet 34 and will therefore be scattered as the associated reflected ray 36.

In particular, I have discovered that when collimated radiation impinges on such a cell, with the direction of the radiation lying parallel to the normal to the frontal plane of the reflective trihedral cell, one third of the radiation fails to make the three reflections required for recuperation, and is thus lost through scattering of the type just discussed for the simplified dihedral case. The radiation which is scattered is that which strikes the peripheral cell areas 38 of FIG. 4. (FIG. 4 refers specifically to scattering from a cell in which the three facets are exactly orthogonal to each other. Scattering from facets between which the angle is slightly less than a right angle, as is the case in some systems described in U.S. Ser. No. 663,370, and in other arrangements described below, is approximately the same.)

To eliminate the losses from scattering, I propose to eliminate the areas 38, but in a way that does not remove any area required for the second or third reflection of radiation which strikes the cell, initially, at some other point. Alternative configurations which permit elimination of the areas in question are illustrated in FIGS. 5-7.

In FIG. 5, a reflective cell having a generally hexagonal frontal configuration and eliminating the cell surfaces previously responsible for the major portion of scattering is formed by cutting off the corners of the triangular cell of FIG. 4 (which corners define the areas 38) to provide the generally hexagonal cell 40 formed by three pentagonal facets 42.

In FIG. 6, the reflective cell 44 is generally triangular in shape and is formed by three facets 46, each of which is of somewhat irregular quadrilateral shape (i.e., a four-sided figure, but not a parallelogram).

In FIG. 7, the portions 38 that contribute to the bulk of scattering are eliminated by cutting off the facets to provide a generally hexagonal cell 48 formed from square facets 50.

Since with the generally hexagonal cell of FIG. 5, alternate sides of the hexagon are intercepted by the vertices of the facets, it is not possible to construct an array of these cells without there being discontinuities in the elevation of facets at the boundaries between adjacent cells. With the square-faceted cells of FIG. 7, however, surface discontinuities between cells do not occur, as is illustrated in FIG. 8, where the vertex of each cell 48 is indicated at 52.

Although the operational features of cells having shapes such as illustrated in FIG. 5 are good, the presence of surface discontinuities does cause problems in cleaning and thus reflective cells of the type illustrated in FIG. 7 are presently preferred. Moreover, cells with square facets have six-fold symmetry about the axis normal to the frontal plane of the cell, giving the cells of this type a further advantage.

Furthermore, in the case of reflective cells with triangular facets, a pair of two cells must be considered in order to obtain the complete response of the reflective array of cells to variations in the polar angle of incidence of the radiation. With the use of square facets such as illustrated in FIGS. 7 and 8, however, a single cell will have the same response as the entire reflecting array with respect to variations in the polar angle of incidence. This fact has implications regarding the size of facets one may use to construct reflecting arrays; implications which are reflected in manufacturing costs. For example, in constructing a reflecting array with square facets, (facets such as illustrated in FIGS. 7 and 8) one could use facets that could be approximately twice as large as triangular facets, that would produce the same reflecting properties over the same area. Naturally, arrays of cells with larger facets are easier, and less expensive, to manufacture. The cell size also affects both dispersion and diffraction from the front edges of an array of cells (which could introduce highly undesirable angular distortion in the reflected radiation.

Diffraction can become significant if the frontal dimension of the reflecting cell becomes too small. For radiant heat recuperation, the wave length of the radiation to be reflected ranges from $1\mu$ to $10\mu$, and for this range of wave lengths one should keep the frontal dimension of the reflecting cell larger than 1 cm, in order to avoid having diffraction that would override all the control of angular tolerances with which the reflectors are manufactured. Thus, in order to avoid undesirable diffraction in the reflected radiation, and to keep the costs of manufacturing down, one would prefer to build the reflecting cells with the largest possible aperture.

The radiation which is scattered from a reflecting array such as described above in connection with FIGS. 7 and 8 falls into fairly sharply defined beams. For example, if the incident radiation has direction cosines (a,b,c) in a coordinate system oriented with the intersections of the facets, and if one set of rays falls first on the facet normal to the $x_1$ direction, the rays reflected from this facet will have direction cosines (−a,b,c). Of the total radiation striking the first facet, the amount which will be scattered (by failing to make a second reflection) will be $[(1−c/a)(1−b/a)]$, and this radiation will lie along the direction (−a,b,c) with respect to coordinates aligned with the intersection of the facets. [Of the total radiation which falls upon the frontal plane of the reflector, the amount of scattered radiation referred to immediately above is $(a/(a+b+c))(1−c/a)(1−b/a)$.] Similar results obtain for the rays which fail to make third reflections; and, of course, similar results obtain as well for each of the other two facets. The net result of this is that for incident radiation oriented at (a,b,c) with respect to the facets, the scattered radiation occurs with orientations defined by the following sets of direction cosines:

| −a, | b, | c, |
| −a, | −b, | c, |
| a, | −b, | c, |
| a, | −b, | −c, |
| a, | b, | −c, or |
| −a, | b, | −c. |

Thus, placement of secondary reflecting panels 54 (see FIG. 9), of the same basic design as the primary panel 56, at proper orientations to the primary panel, would return the scattered radiation to the primary panel. If the facets of the reflecting cells of the secondary panels were exactly orthogonal, so that reflected radiation were exactly parallel to the incident radiation, and if the frontal dimension of the reflecting cells of the secondary panels were sufficiently small compared with the size of those on the primary panel, then the scattered radiation incident on the secondary panels would be returned not only to the primary panel, but to facets of the same orientation as those from which it made its final reflection prior to traveling to the secondary panel. The scattered radiation would then be returned from the primary panel directly back to its source.

In this process the scattered radiation would have to undergo a total of either 5 or 6 reflections in order to be returned to the high temperature source within the open door 22 of an industrial furnace. The total radiation returned to the source, of the part which is normally lost through scattering and which undergoes the process described above, will then be either the fourth power of the reflectance or the fifth power of the reflectance. For example, with a reflectance of 0.90 the radiation returned to the source will be either $(0.90)^6 = 0.531$, or $(0.90)^5 = 0.590$, of the fraction which was originally scattered. For a reflectance of 0.98 the corresponding fractions would be 0.886 or 0.904.

The practical implications of this are as follows. Suppose the angle of incidence of radiation on a primary reflecting panel were 15°. Further, suppose that the reflectance of the individual facets were somewhere between 0.98 and 0.90, say 0.95. Then the scattering losses from the primary panel would represent approximately 38 percent to 36 percent of the total energy incident upon the primary panel. By employing secondary panels of appropriate size and orientation, and with facets of the same reflectance, one could reduce this loss so that 0.308 to 0.326 of the radiation that would normally be lost via scattering would be returned to the high temperature source. This would raise the efficiency of the recuperator system from approximately 0.657 to approximately 0.965.

Another physical mechanism by which energy may fail to be returned to the source is dispersion. This phenomenon can be explained with reference to FIG. 10 which is a schematic illustration of a single dihedral reflector 58 which has been greatly enlarged, for clarity, relative to the distance from the plane 60 of source 62 along the axis 64 of the reflector cell. With the angle 66 between the facets of the cell 58 set up precisely at a right angle, (in accordance with conventional "corner cube" theory) the extreme rays 68 which will be doubly reflected (i.e., not scattered) undergo a first reflection on one face at a location 70 spaced inwardly from the extreme edge 72 of the respective face and receive a second reflection at the extreme edge 72 of the other face, thereby being turned into a reflected ray 74. The extreme reflected ray 74 defines a region on the plane 60 of source 62 that has twice the width as the width of cell 58 (i.e., the distance across the open end of the cell 58 between the extreme edges 72 of the cell faces). This return of a wider beam than that radiated is what is meant by "dispersion."

This means that the diameter of the reflected beam, at the plane of the source, is twice as large as the aperture of the reflecting cell. Clearly, if one were to build very large reflecting cells, with facets perfectly aligned at right angles (i.e. perfect cube corner reflectors) the reflected radiation might largely miss the portal from which it came. If, for example, the size of the reflecting cell were the same as the size of the portal from which the radiant heat is issuing, then (in the case of a reflecting cell with three facets at right angles) the width of the beam returned to the plane of the portal would be twice that of the portal; the area of the beam would be four times as great as that of the portal. This would be true no matter how far the reflecting cell (or cells) were placed from the portal. And, it would represent a highly significant detraction from the performance of the reflecting cell as a heat recuperator; only about 25 percent of the reflected radiation could actually find its way back into the portal.

Thus, it is of importance in radiant heat recuperation, and possibly in other fields of application of retroreflection, to find means to constrain the effects of dispersion, while still keeping the size of the aperture of the reflecting cells relatively large.

Figure 11A:
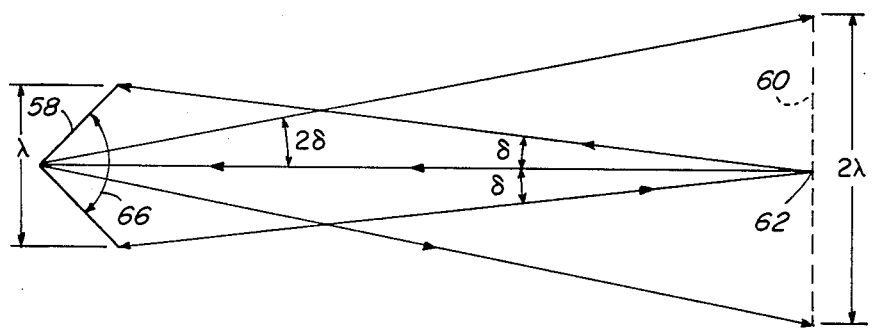
FIGS. 11A and 11B schematically illustrate dispersion as a function of source location for a dihedral cell having a facet angle of $(\pi/2 - \delta)$.

The effect of providing an angle 66 between the cell facets that is slightly less than a right angle is illustrated in FIG. 11A. As is known, a property of such an angle is that an incoming ray is returned as the reflected ray making an angle of $2\delta$ where the angle 66 is $(\pi/2 - \delta)$ radians. As is evident from FIG. 11A, the result is still a substantial dispersion producing a reflected image on the plane 60 that is substantially twice the cell width $\lambda$.

Figure 11B:
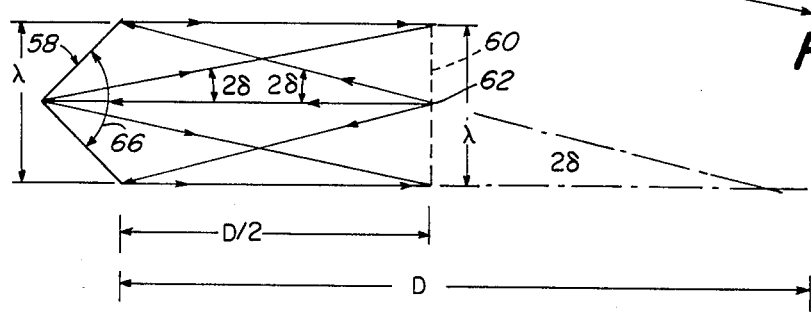

In FIG. 11A a ray 65 emanates from source 62 and travels just above the axis, into the reflecting cell. As the figure shows, because the reflected ray 67 crosses the path of the incoming ray at the angle $2\delta$, the reflected ray arrives at the plane of the source at the distance $\lambda$ above 62. The beam of radiation that emanates from 62 to the reflecting cell is reflected back to the plane of the source, with a dispersion that spreads the energy of the reflected beam over an area having a diameter twice as large as the aperture ($\lambda$) of the reflecting cell. In this illustration, however, the distance, D, from the source 62 to the frontal plane of the cell 58 is $D = \lambda/2\delta$. As is illustrated in FIG. 11B, by locating the source 62 at a distance of D/2 from the frontal plane of the reflecting cell 58, the width of image on the plane 60 of the source 62 is substantially $\lambda$, rather than $2\lambda$.

Figure 12:
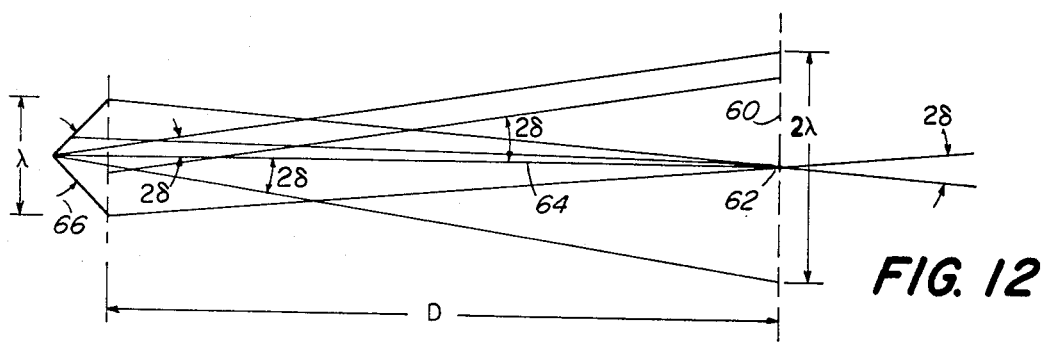
FIG. 12 is an illustration, similar to FIG. 11A, showing additional dispersion effects.

Analysis of the paths of both the inner and outer rays radiated from the source 62 leads to a further discovery, as illustrated in FIG. 12. With the source 62 placed at the full distance D from the frontal plane of the reflecting cell 58, it is found that the innermost rays adjacent the axis 64 of the cell 58 define the outer boundaries of the image that has a width of $2\lambda$ at the plane 60 of source 62. The outermost rays are reflected to intersect at the source having an angle of $2\delta$ between them. The result is a reflected radiation pattern behind the source 62 (i.e., to the right of the source 62 as viewed in FIG. 12) in the form of a diverging cone having a central dark cone therewithin and an illuminated annulus of radius $\lambda$.

Figure 13:
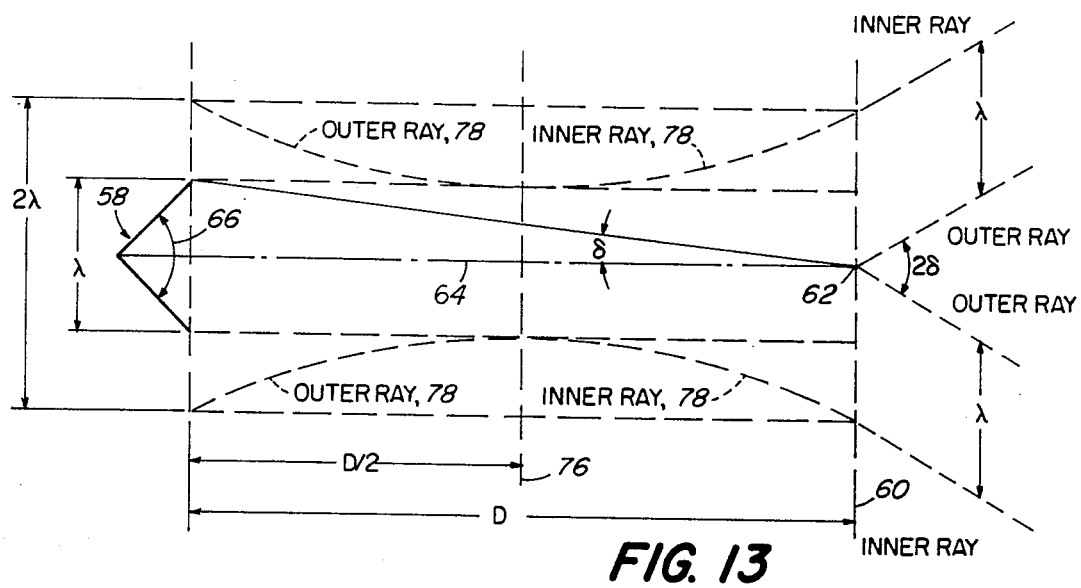
FIG. 13 is a schematic illustration summarizing dispersion effects as a function of distance from a dihedral reflective cell.

The envelope of this dispersion pattern is illustrated in FIG. 13. Between the reference plane 76 located at a distance D/2 from the frontal plane of the reflective cell 58 and that cell itself, the dispersion envelope 78 is defined by the outer ray emitted from the source. Beyond the plane 76, however, the outer envelope 78 is defined by the inner ray radiated from the source which is dispersed by the cell 58 in a manner to cross the outer ray at the location of plane 76. Beyond the plane 60 located at a distance D from the frontal plane of the reflective cell 58, the inner ray still defines the outer envelope 78 of the dispersion pattern and the conical umbra having an apex angle of $2\delta$ appears.

This means that by deliberately placing the facets of the reflecting cell at $(\pi/2 - \delta)$, rather than at $\pi/2$, and by placing the reflecting cell at the distance D/2 from the source, the reflecting cell will reflect the beam from the source with only one half as great dispersion as would a pair of reflecting facets of the same size, perfectly aligned (if that were achievable) at right angles.

Moreover, as long as the source is located no further than the distance D from the reflecting cell, the dispersion of the reflected beam will not exceed that of a beam reflected from a set of facets perfectly aligned at right angles. These facts have especially important implications in manufacturing processes and associated costs in mass production of retroreflecting cells for radiant heat recuperation. They may be important in production of retroreflecting cells for other purposes as well.

By deliberately introducing departures from perfect alignment of the retroreflecting facets at 90°, one can produce a retroreflecting cell that, when used within a prescribed distance from the source of radiation, functions actually with greater effectiveness than a perfectly aligned cube corner facet. Moreover, the structure of the reflecting cell is considerably simpler and less expensive to manufacture in large quantities than would be a large quantity of cube corner reflectors with facets nearly perfectly aligned at right angles.

Figure 14:
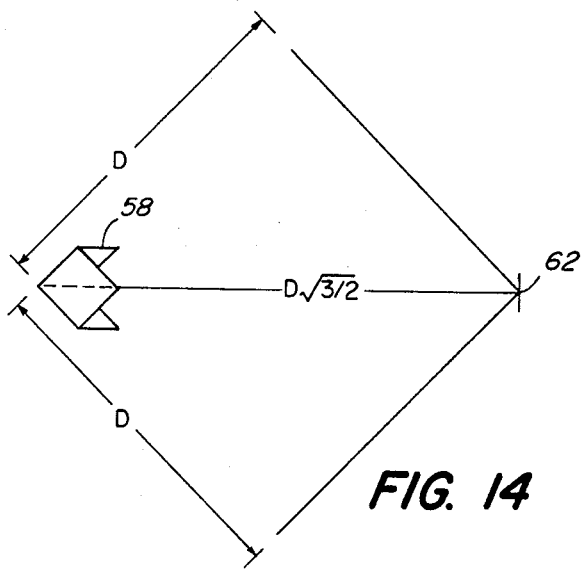
FIG. 14 schematically illustrates the modification, for the case of trihedral cells, of parameters identified in FIGS. 11A–13.

The preceding discussion of dispersion effects has, for simplicity, considered the case of a dihedral reflective cell 58. While essentially the same analysis applies, in a somewhat more complicated geometrical form, to a trihedral reflective cell, there is one changed relationship between the parameters involved. Referring to FIG. 14, there is illustrated the relationship that the "focal distance" (i.e., the distance D of FIG. 13) for a trihedral cell is $(3/2)^{\frac{1}{2}}$ times as large as that of a dihedral cell having the same values of $\lambda$ and $\delta$.

EXAMPLE

To gain an appreciation of the advantages of the present structure one may consider the following example.

Suppose one wished to produce a reflecting cell with three facets (a tri-hedral cell) that would return radiant energy to a source ten feet from the cell in such a way that the width of any reflected beam of energy, at the plane of the source, did not exceed six inches. One way to do this would be to use a perfect cube corner reflector having an aperture of three inches. Another way to do the same thing would be to use the reflecting cell, as described above.

For a triplet of facets aligned precisely at right angles, straight forward geometry will show that $$D_{triplet} = \sqrt{3/2} D.$$

For facets aligned nearly at right angles (i.e. at $\pi/2 - \delta$; $\delta << 1$), this formula gives an approximation to the relationship between focal lengths of pairs and triplets of facets, that is sufficiently accurate for all purposes of design.

Thus, if one wishes to use the present reflecting cell at a distance of 120 inches from a source to reflect energy to the plane of the source so that the diameter of a reflected beam does not exceed 6 inches at the plane of the source, one may use a cell of 6 inch aperture, with the angles between the facets so selected that the focal length of each pair of facets D/2 is equal to $120/\sqrt{3/2}$ inches.
That is $$(D/2) \cdot \sqrt{3/2} = 120 \text{ inches.}$$

In this case, the width of the reflected beam will not exceed the aperture size, which we have selected to be 6 inches. For this case (i.e. an aperture size of 6 inches and a focal length of the triplet of 120 inches), the angle between the facets must be 89.12290962 degrees, or 89°, 07′,22″.

Now, not only does the use of the present reflecting cell structure permit one to use a 6 inch aperture reflecting cell, in place of 3 inch aperture cells with perfect corner cube alignment, but it also permits one to work with much more generous, and less costly, manufacturing tolerances. On the first point, the use of larger diameter reflecting cells, one notes that by being able to increase the allowable aperture of the cell by a factor of two, one is able to use one fourth as many cells to cover the same area. Since a considerable component of the cost of fabricating an array of reflecting cells is the assembly of individual cells (or an assembly of the dies for individual cells) reduction of the number of cells required has, in itself, a significant effect on costs.

But, the angular tolerances are of even greater significance. To obtain the desired results in the example above one must be able to orient the pairs of facets at an angle which differs from a right angle by $$(90°, 00', 00'' - 89°, 07', 22'') = 52', 38''.$$

Now, with standard die shop practice one can hold an angular tolerance of 5′ of arc. And, by using somewhat more exacting procedures one can hold angular tolerances of 30″ of arc. These latter procedures are regularly applied in optical manufacturing and in precision die work. Thus, by using everyday technology one can establish the desired deviation from a perfect right angle (i.e. $\delta = 52'$, $38''$) within somewhat less than ten percent variation (by standard practice) on to within about one percent variation (by regularly applied more exacting practice).

Now, if one misplaces the reflecting cell so that it is at the distance $D_x = D_t + \Delta D_t$ from the source, the width of the reflected beam will be ($\propto \lambda$) rather than $\lambda$ (with $\propto \geq 1$). The effect of misplacing the cell is equivalent to having an error ($\epsilon$) in the angle between the facets of the cell. (That is, the angle between the facets would differ from $\pi/2$ by ($\delta_o \pm \delta$) rather than by exactly $\delta_o$.) A change in angle between facets changes the focal distance of the cell.

If one considers the latitude $\Delta D$, in placement of the cell before the source, so that the reflected beam will be of width no greater than $\propto \lambda$ at the plane of the source, while the (effective) angular error in the alignment of the pairs of facets in the cell is $\hat{\epsilon}$ (i.e. the facets are oriented at $\pi/2 - (\delta_o \pm \hat{\epsilon})$, one finds that the ratio of the first mentioned latitude in placement to the nominal focal distance of the cell ($D_t$) (which corresponds to the alignment of the facets at precisely $\pi/2 - \delta_o$) is given by $$\Delta D/D_f = 2(\propto - 1 - \hat{\epsilon}/\delta_o$$

Since each ray must undergo three reflections in any cell, the value of $\epsilon$ that one uses in the formula above is related to the angular tolerance ($\epsilon$) in any one pair of facets by $$\hat{\epsilon} = \sqrt{3}\epsilon$$

Assuming the use of exacting practice in forming the angles (as mentioned above), for the example 120 in. focal length, 6 in. aperture) cited here, the quantity $\hat{\epsilon}/\delta_o$ is somewhat less than 0.02, i.e. two percent. This means that if one were to specify that the width of the reflected beam were not to exceed, say, 6.6 inches, (i.e. α = 1.1), the latitude in placement of the cell could be $$\Delta D_t/D_t = 2(1.1 - 1 - 0.02) = 0.16,$$

or 16 percent of the nominal focal distance of the cell (or ensemble of cells). Thus, a source located anywhere at a distance from 139.2 inches to 100.8 inches would receive reflected radiation in a beam not exceeding 6.6 inches in width. This would be equivalent to the performance of an array of perfect cube corner reflecting cells having an aperture of 3.3 inches, and covering the same area as the six inch aperture cell.

While particular preferred embodiments of the invention are illustrated in the accompanying drawings and described in detail herein, other embodiments are within the scope of the invention as defined in the claims.

What is claimed is:

1. A heat recuperator for returning an incident beam of radiative energy to its source, said beam incident from any direction within a predetermined solid angle, said recuperator comprising a main array of radiant heat reflecting cells each comprising a substrate defining at least three planar surfaces intersecting each other in angles of approximately 90°, each said planar surface being in the form of a geometric figure having at least four edges, front substrate surfaces facing said solid angle being reflective of a major fraction of incident electromagnetic radiation in the wavelength band of about 1 micron to about 20 microns said incident beam of radiation having direction cosines (a,b,c) in the coordinate system oriented with the intersections of said planar surfaces, the recuperator further including at least one secondary array of said reflecting cells, said secondary array positioned with respect to said main array at a direction defined by a set of direction cosines chosen from the following group:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

2. The recuperator of claim 1 wherein there are provided at least two said secondary arrays, said secondary arrays being symmetrically positioned with respect to said main array.

3. The recuperator of claim 2 wherein a secondary array of reflective cells is provided at each of the directions with respect to the main array defined by the direction cosines:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

4. A heat recuperator for returning an incident beam of radiative energy to its source, said beam incident from any direction within a predetermined solid angle, said recuperator comprising a main array of radiant heat reflecting cells each comprising a substrate defining at least three planar surfaces intersecting each other in angles of (π/2−δ) radians and defining cells having an aperture dimension of λ, each said planar surface being in the form of a geometric figure having at least four edges, front substrate surfaces facing said solid angle being reflective of a major fraction of incident electromagnetic radiation in the wavelength band of about 1 micron to about 20 microns, said recuperator being for use with a source of said incident beam that is located at a distance of about $\sqrt{3/2}$ (λ/4δ) from said main array.

5. A heat recuperator for reflecting radiative energy in an incident beam, incident from any direction within a predetermined solid angle, into a reflected beam making an angle of substantially 180° with said incident beam in at least one plane, the recuperator comprising a first array of reflecting cells each comprising a substrate defining a plurality of planar surfaces intersecting each other in angles of approximately 90°, front substrate surfaces facing said solid angle being reflective of a major fraction of incident electromagnetic radiation in the wavelength band of about 1 micron to about 20 microns, said incident beam having direction cosines (a, b, c) in the coordinate system oriented with the intersections of said cell planar surfaces, said recuperator further comprising a secondary array of reflecting cells constructed in the same manner as said first array and positioned with respect to said first array such that, with respect to said first array, said second array lies in a plane approximately perpendicular to a direction defined by direction cosines chosen from the following group:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

6. The heat recuperator of claim 5 wherein there are provided at least two secondary arrays of reflective cells, said secondary arrays being symmetrically disposed with respect to said first array.

7. The recuperator of claim 5 wherein there is provided a secondary array positioned at each of said directions defined by said direction cosines:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

8. A heat recuperator for returning radiant heat to a source radiating into a predetermined solid angle from a predetermined location, the recuperator comprising a first array of reflective cells, each reflective cell comprising a substrate defining two planar surfaces intersecting each other in an angle of (π/2−δ) radians, the front substrate surfaces facing said solid angle being reflective of a major fraction of incident electromagnetic radiation in the wavelength band of about 1 micron to about 20 microns, each said cell having an aperture dimension of about λ, said first array positioned at a distance of at least about (λ/4δ) and no greater than ($\lambda/2\delta$) from said source with the cell apertures facing said source.

9. A heat recuperator for returning radiant heat to a source radiating into a predetermined solid angle from a predetermined location, the recuperator comprising a first array of reflective cells, each reflective cell comprising a substrate defining three planar surfaces intersecting each other in an angle of ($\pi/2-\delta$) radians, the front substrate surfaces facing said solid angle being reflective of a major fraction of incident electromagnetic radiation in the wavelength band of about 1 micron to about 20 microns, each said cell having an aperture dimension of about $\lambda$, said first array positioned at a distance of at least about $[\sqrt{3/2}\,(\lambda/4\delta)]$ and no greater than $[\sqrt{3/2}\,(\lambda/2\delta)]$ from said source with the cell apertures facing said source.

10. The recuperator of claim 9 for use in conjunction with an incident beam of radiation having direction cosines (a, b, c) in the coordinate system oriented with the intersections of said planar surfaces, the recuperator further including at least one secondary array of said reflecting cells, said secondary array positioned with respect to said main array at a direction defined by a set of direction cosines chosen from the following group:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

11. The recuperator of claim 10 wherein there are provided at least two said secondary arrays, said secondary arrays being symmetrically positioned with respect to said main array.

12. The recuperator of claim 11 wherein a secondary array of reflective cells is provided at each of the directions with respect to the main array defined by the direction cosines:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

13. The heat recuperator of claim 9 wherein each of said planar surfaces has at least four edges.

14. The method of returning radiant heat energy to a source of radiation comprising the steps of
  (a) determining the solid angle into which said energy is radiated,
  (b) assembling a first array of reflecting cells, each cell comprising two reflective surfaces disposed with respect to each other at angles of about ($\pi/2-\delta$) radians, each cell having an aperture dimension of about $\lambda$, and
  (c) supporting said first array within said solid angle at a distance from said source lying in the range of at least about ($\lambda/4\delta$) and no greater than about ($\lambda/2\delta$).

15. The method of returning radiant heat energy to a source of radiation comprising the steps of
  (a) determining the solid angle into which said energy is radiated,
  (b) assembling a first array of reflecting cells, each cell comprising three reflective surfaces disposed with respect to each other at angles of about ($\pi/2-\delta$) radians, each cell having an aperture dimension of about $\lambda$, and
  (c) supporting said first array within said solid angle at a distance from said source lying in the range of at least about $[\sqrt{3/2}\,(\lambda/4\delta)]$ and no greater than about $[\sqrt{3/2}\,(\lambda/2\delta)]$.

16. The method of claim 15 wherein said first array is supported substantially at a distance from said source of $[\sqrt{3/2}\,(\lambda/4\delta)]$.

17. The method of claim 15 further including the steps of assembling at least one secondary array of said reflective cells and supporting each said secondary array at a position such that it intercepts, and returns to said first array, radiant heat energy scattered from said first array.

18. The method of claim 17 wherein said first array is supported with respect to said source such that radiant heat energy is incident on said first array with direction cosines of (a, b, c) in the coordinate system oriented with the intersections of said cell reflective surfaces, and wherein each secondary array is supported with respect to said first array at a direction defined by a set of direction cosines chosen from the following group:

| | | |
|---|---|---|
| −a, | b, | c; |
| −a, | −b, | c; |
| a, | −b, | c; |
| a, | −b, | −c; |
| a, | b, | −c; |
| −a, | b, | −c. |

* * * * *